Aug. 17, 1943.  D. B. LIVINGSTON  2,326,785
WINCH STRUCTURE
Filed June 12, 1941
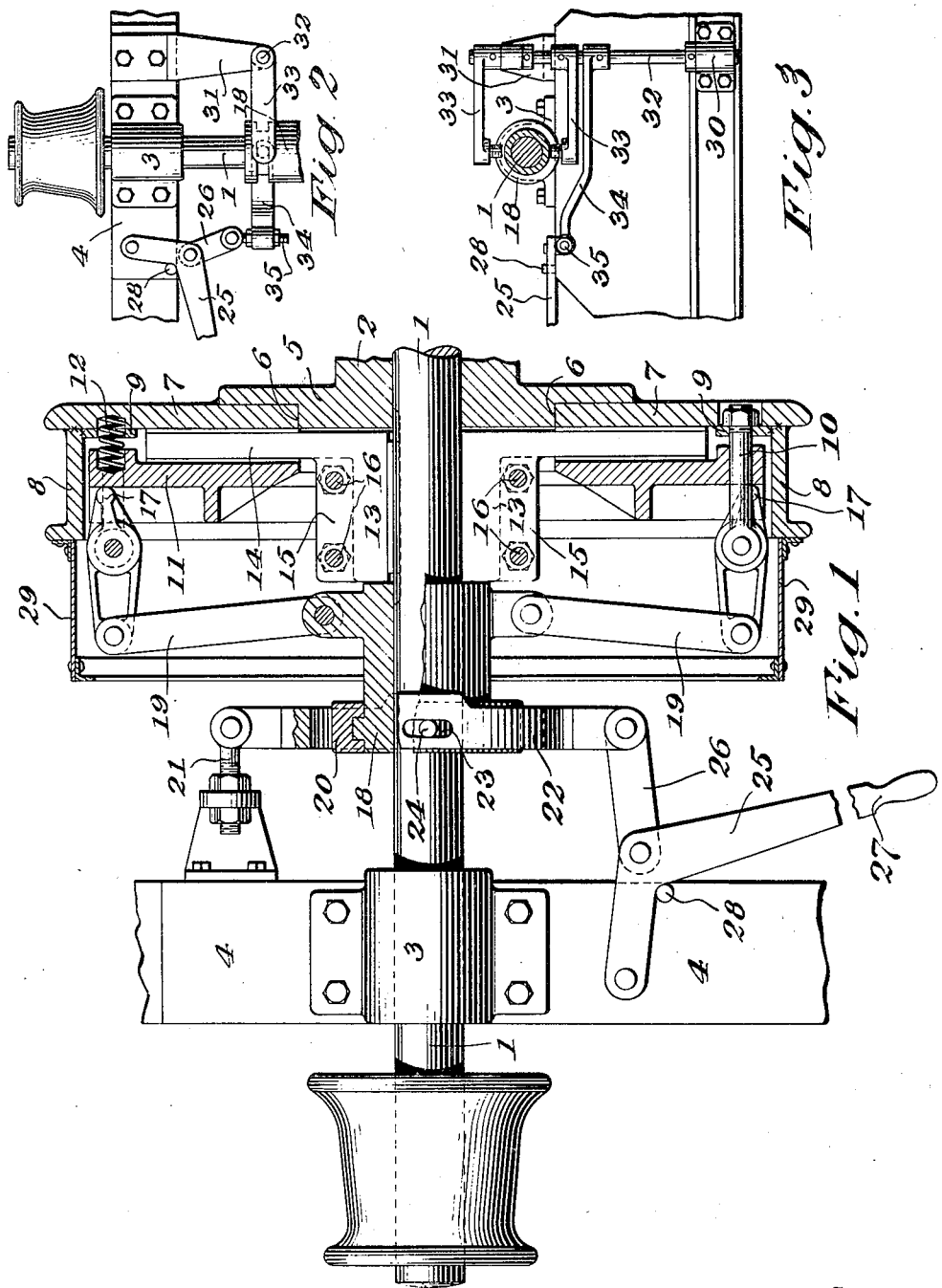
Inventor
Donald B. Livingston
By Spear, Rawlings & Spear
Attorneys Patented Aug. 17, 1943

2,326,785

UNITED STATES PATENT OFFICE 2,326,785

WINCH STRUCTURE

Donald B. Livingston, Beverly, Mass., assignor, by direct and mesne assignments, of one-half to Kinney Manufacturing Company, Jamaica Plain, Mass., a corporation of Massachusetts, and one-half to Randolph C. Perrin, Gloucester, Mass.

Application June 12, 1941, Serial No. 397,729

6 Claims. (Cl. 254—187)

My present invention relates to novel winch construction, particularly adapted for marine uses, since it combines adequate mechanical advantage with sensitivity of control in the coupling of the drums to their shafts.

The usual marine winch installation comprises a pair of drums supported by a common drive shaft for rotation independently thereof, a separate clutch to couple each drum to the shaft, and a brake to control each drum when its clutch is disengaged.

Sensitivity of control and ease of operation are essential requirements of winches as these factors permit the gear to be handled without risk of damage to it or to the ship and increase the chances of being able to save the gear if it becomes fouled on the ocean bottom.

The clutches in winches prior to my invention were of the cone type. While that type of clutch permitted the winch equipment to be relatively compact, cone clutches have an inherent tendency to stick when engaged, making sensitivity of control and ease of operation impossible regardless of the mechanical advantage afforded by the clutch operating mechanism. This tendency to stick is aggravated by the fact that bearing wear increases the difficulty of engaging and disengaging such clutches as the weight of the drum then becomes a factor determining the effort required to operate the clutch. Bearing wear, when cone clutches are employed, is also objectionable in that the resulting eccentricity of the coacting clutch elements makes for improper engagement that frequently results in injury to the clutch linings.

In accordance with my invention I provide winch mechanism that employs flat faced clutch elements housed by the brake drum on one end of each of the winch drums. The clutch elements are clamped together by cams actuated at a substantial mechanical advantage through linkage by shifting a hub slidably mounted on the drive shaft to which one of the clutch elements is keyed. The hub is actuated by compact linkage to provide adequate mechanical advantage in engaging the clutch.

With winches in accordance with my invention, the flat faced clutch elements are positive in their coaction, regardless of bearing wear, ensuring long life, and as the clutch linings are made in sections, repair and service is made easy and may be readily accomplished at sea.

A further advantage of my invention is that it enables the brake actuating means and the clutch actuating means to be located in such proximity to each other that the operator may control the winch brake and the clutch without the necessity of moving his position or having to stretch to reach the brake or the clutch operating control.

Winch mechanism in accordance with my invention are effective because it makes possible a simple and durable enclosed clutch construction. The clamping clutch element is slidably supported by the clutch element established by one end of the drum and the clutch engaging pressures developed by the cams is exerted against the clamping clutch element in the zone of its slidable support. With this construction either the intermediate clutch element or the drum may be slidable with reference to the shaft.

As my invention is concerned with novel clutch and drum construction in winches that may otherwise be conventional, I have shown in the accompanying drawing only sufficient structure to illustrate an embodiment of my invention and permit its novel features and advantages to be readily appreciated. In the drawing:

Fig. 1 is a fragmentary view of a winch showing in section the clutch construction.

Fig. 2 is a similar view of a modified form of clutch actuating mechanism, and

Fig. 3 is a fragmentary vertical section showing an end view of the actuating mechanism of Fig. 2.

The drive shaft 1 carries conventionally a pair of independent rotatable drums 2, of which only one is shown, and is journalled in a bearing 3 carried by a support 4 adjacent each end of the winch. One end flange 5 of the drum 2 presents an annular shoulder 6 and rigidly supports an annular plate 7 constituting a first flat faced clutch element.

In accordance with my invention an annular shell 8 and a ring 9 are welded to the plate 7. The shell 8 establishes a drum for conventional brake mechanism, not shown, and also serves to house the clutch. I form the plate 7 and and the ring 9 with a plurality of pairs of holes to receive bolts 10 slidably supporting an annular plate 11 constituting a second flat faced clutch element. The apertures in the plate 7 are of sufficient size to receive the adjusting nuts on the bolts 10 which seat against the ring 9, so that while they are accessible for adjustment, they do not interfere with the drum 2. Intermediate each pair of bolts, the ring 9 and the clutch element 11 are recessed to support a spring 12 normally holding the clutch elements 7 and 11 in a position wherein the clutch is disengaged.

A hub 13 is keyed to the shaft 1 and includes a flat faced plate 14 constituting a third clutch element supported intermediate the clutch elements 7 and 11. For convenience in assembling and servicing the clutch, I form the hub 13 and plate 14 in sections. The hub sections are flanged as at 15 to receive clamping bolts 16.

The ends of each pair of bolts 10 pivotally support a cam 17 engageable with the plate 11. The ends of the cams 17 are connected to a hub 18 slidable on the shaft 1 by links 19. The hub 18 carries an independently rotatable ring 20 and preferably both the hub 18 and the ring 20 are formed of sections clamped together.

The support 4 is spaced from the drum 2 substantially the distance required to slide the hub 18 into and out of a position wherein the clutch elements are clamped together and on it I mount an adjustable fulcrum 21 for one end of the shifter lever 22 formed with slots 23 to receive pins 24 carried by the ring 20. A second lever 25 pivoted to the support 4 is connected to the other end of the lever 22 by a link 26 to establish a toggle for actuating the hub 18 at a predetermined mechanical advantage. While the toggle mechanism may be manually actuated in any desired way, I have shown the lever 25 as having an outwardly directed handle portion 27, and it will be apparent that the handle 27 is located sufficiently close to the brake so that both may be conveniently controlled by the operator. Locking means such as a pull pin 28 may be employed to lock the mechanism in desired position to prevent accidental disengagement.

The use of my clutch operating mechanism is of advantage in that the cams permit the shifting of the hub 18 to effect clutch engagement at a substantial mechanical advantage and the clutch to be locked when engaged. While the hub 18 is actuated by linkage to establish positive and sensitive control of the operation of the clutch, there is no reactive pressure to cause wear on the hub 18 and the ring 20 while the clutch is engaged.

The levers 22 and 25 are pivotally connected to the support 4 on opposite sides of the shaft 1 and their radial distance from the shaft 1 is less than the radius of the brake drum 8. While the brake drum 8 houses the clutch elements, I also provide an annular guard 29 carried by the drum 2 to shield all the revolving parts.

A winch, in accordance with my invention, may be readily assembled and serviced. As the nuts on the bolts 10 are located on the inner surface of the plate 7 adjacent the periphery thereof, they may be easily removed to permit the bolt 10 to be withdrawn. With the actuating mechanism in its inoperative position, the plate 11 may be moved rearwardly to a position where it is accessible. Preferably, the guard 29 is first removed. By removing the bolts 16, the sections which make up the clutch member 14 may be removed after the plate 11 has been moved away from it.

In Figs. 2 and 3 I have shown a modified form of clutch actuating mechanism in which the base 30 and the bracket 31 on the support 4 support a shaft 32 at right angles to the shaft 1. The shaft 31 carries shifter fork members 33 to engage with the ring 20 and a lever 34 that has an adjustable connection 35 with the link 26.

In the embodiment of my invention shown in the drawing, the drum 2 is slidable on the shaft 1 and the plate 14 is fixed thereon so that clutch engagement results by clamping the plates 7 and 11 against the plate 14.

If desired, the drum 2 may be mounted on the shaft 1 for independent rotation but held against sliding movement in which event the plate 14 is slidably supported and driven by its hub 13 as shown in my copending application Serial No. 376,051, filed January 27, 1941, now Patent No. 2,286,862, dated June 16, 1942.

It will be appreciated that winches in accordance with my invention are well adapted for marine use in that the clutch and its operating mechanism are sensitive and easily actuated. Because of the linkage and the use of the brake drum as a housing for the clutch, winches in accordance with my invention are suitably compact and may be easily controlled and serviced.

What I therefore claim and desire to secure by Letters Patent is:

1. Winch mechanism comprising a shaft, a drum supported by said shaft for rotation independently thereof, one end of said drum constituting one clutch element and including an annular flange constituting a brake drum, a second member splined to said shaft, said second member comprising a pair of complemental sections each including a hub establishing portion and a disc establishing portion, means attaching said hub portions to each other about said shaft to assemble said sections so that said disc establishing portions present a second clutch element housed by said brake drum, a third clutch element, means detachably carried by said drum slidably supporting said third clutch element intermediate said assembled hub portions and said brake drum for axial movement, one of said first two named clutch elements being slidable relative to each other, and operator controlled means connected to said means supporting said third element to effect engagement of said clutch elements, said operator controlled means having an inoperative position wherein on detachment of said third element supporting means said third element may be positioned to permit said assembled sections to be disconnected from each other and removed from said shaft.

2. Winch mechanism as in claim 1, in which part of the operator controlled means rotates with the shaft when the clutch elements are in engagement and an annular guard is detachably secured to the brake drum to house this part of the operator controlled means.

3. Winch mechanism comprising a shaft, a drum supported by said shaft for rotation independently thereof, one end of said drum constituting one clutch element and including an annular flange constituting a brake drum, a second member splined to said shaft, said second member comprising a pair of complemental sections each including a hub establishing portion and a disc establishing portion, means attaching said hub portions to each other about said shaft to assemble said sections so that said disc establishing portions present a second clutch element, a third clutch element, means detachably carried by said drum slidably supporting said third clutch element for axial movement, one of said first two named clutch elements being slidable relative to each other, and operator controlled means connected to said means supporting said third element to effect engagement of said clutch elements, said operator controlled means having an inoperative position wherein on detachment of said third element supporting means, said third element may be positioned to permit said assembled sections to be disconnected from each other and removed from said shaft.

4. Winch mechanism comprising a shaft, a winch drum supported by said shaft for rotation independently thereof, the outer surface of one end of said drum presenting a flat-faced clutch surface establishing a first clutch member, a second clutch member splined to said shaft, a third clutch member, means extending through said drum and slidably supporting said third clutch member, detachable means to lock said supporting means to said drum end, said detachable means being exposed on the inner surface of said drum end, one of said first two named clutch members being slidable relative to the other and operator controlled means connected to said supporting means for engagement with said third clutch member to effect, when actuated, engagement of said clutch members.

5. The winch mechanism of claim 4 in which the detachable means are countersunk with respect to the said inner surface of said drum.

6. Winch mechanism comprising a shaft, a winch drum supported by said shaft for rotation independently thereof, one end of said drum having apertures therethrough adjacent its periphery, the outer surface of said drum presenting a flat-faced clutch surface defining a first clutch member, an annular member attached to said flat-faced surface, said annular member having apertured therethrough smaller than but alined with the apertures in said drum end, a second clutch member splined to said shaft, a third clutch member, a plurality of means slidably supporting said third clutch member, each of said means including a threaded end extending through said alined apertures and a nut threaded on each of said threaded ends, said nuts fitting within said apertures in said drum end and being seated against said annular member, one of said first two named clutch members being slidable relative to the other, and operator controlled means connected to said supporting means to effect, when actuated, engagement of said clutch members.

DONALD B. LIVINGSTON.